United States Patent

Hirose et al.

[11] Patent Number: 5,934,538
[45] Date of Patent: Aug. 10, 1999

[54] PINCH ROLLER AND PINCH ROLLER APPARATUS

[75] Inventors: Mitsuaki Hirose, Osaka; Hiroyuki Yamazaki, Kyoto; Yukiharu Uemura, Kanagawa, all of Japan

[73] Assignees: Yamauchi Corporation, Osaka; Oiles Corporation, Tokyo, both of Japan

[21] Appl. No.: 08/967,308

[22] Filed: Oct. 21, 1997

[30] Foreign Application Priority Data

Feb. 12, 1997 [JP] Japan ................................. 9-028007

[51] Int. Cl.⁶ .................................................... B65H 20/00
[52] U.S. Cl. ........................................... 226/194; 226/180
[58] Field of Search ................................ 226/194, 190, 226/180

[56] References Cited

U.S. PATENT DOCUMENTS

| | | | |
|---|---|---|---|
| 3,537,661 | 11/1970 | Isom | 226/194 X |
| 3,659,797 | 5/1972 | Coy | 226/194 X |
| 3,907,234 | 9/1975 | Sato et al. | 226/194 X |
| 4,033,495 | 7/1977 | Platt | 226/190 X |
| 4,378,899 | 4/1983 | Sanford | 226/190 X |
| 4,440,359 | 4/1984 | Nelson | 226/190 X |
| 4,607,808 | 8/1986 | Collins | 226/190 X |
| 4,648,563 | 3/1987 | Tollefson | 226/194 X |
| 5,452,833 | 9/1995 | Hutter | 226/194 |
| 5,803,336 | 9/1998 | Kim | 226/194 |

FOREIGN PATENT DOCUMENTS

| | | |
|---|---|---|
| 60-102744 U | 7/1985 | Japan . |
| A61-115266 | 6/1986 | Japan . |
| 3-28320 U | 3/1991 | Japan . |
| A7- 65443 | 3/1995 | Japan . |
| A7-282492 | 10/1995 | Japan . |

*Primary Examiner*—Michael Mansen
*Attorney, Agent, or Firm*—Birch, Stewart, Kolasch & Birch, LLP

[57] ABSTRACT

A pinch roller apparatus fully satisfying tape running stability and bearing durability is disclosed. A roller shaft is arranged inclined such that its tip end is closer to a capstan. A plain bearing is formed of resin having a Young's modulus of 10 kgf/mm² to 1500 kgf/mm². Self alignment of the pinch roller is realized by elastic deformation of the plain bearing.

18 Claims, 4 Drawing Sheets

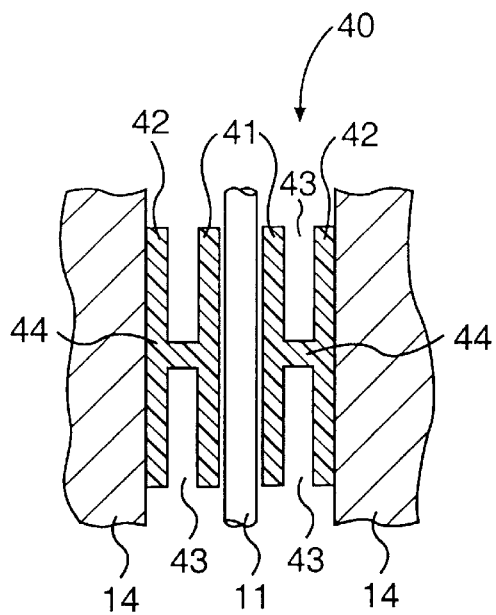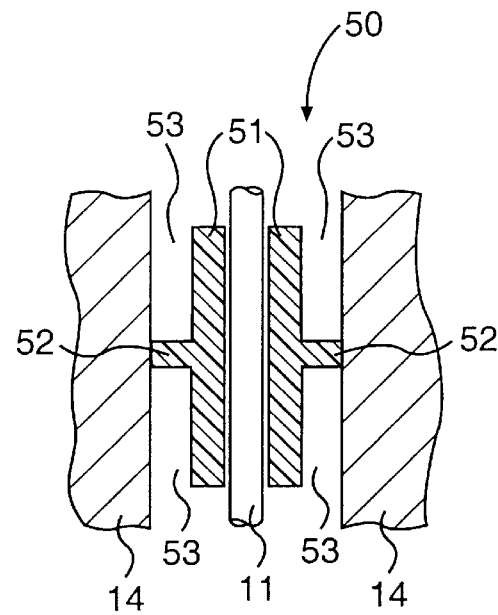
FIG. 4  FIG. 5
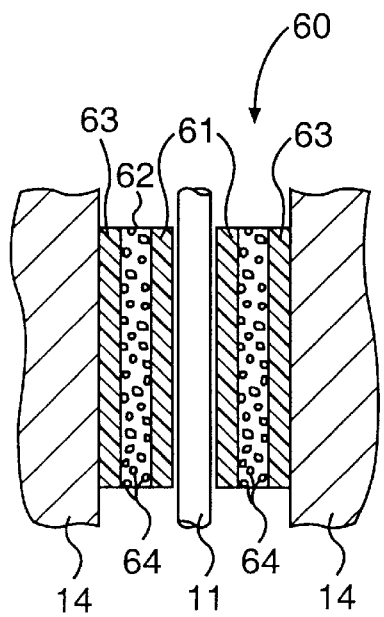
FIG. 6

PINCH ROLLER AND PINCH ROLLER APPARATUS

BACKGROUND OF THE INVENTION

1. Field of the Invention

The present invention relates to a pinch roller apparatus used for a tape recorder, a VTR or the like.

2. Description of the Background Art

A pinch roller apparatus includes a rotationally driven capstan, and a pinch roller including a roller body pressed against the capstan. A tape is pinched between the capstan and the roller body which are in pressure contact, and moved in a prescribed direction.

General requirements for the pinch roller include tape running stability and durability of the pinch roller itself.

One factor determining the tape running stability is a self alignment function of the pinch roller. By the self alignment function, error or difference in parallelism between the axis of the capstan and the pinch roller, which is inevitable in design and manufacturing, is absorbed by a play in the direction of inclination of the roller body of the pinch roller with respect to the roller shaft, so that the axis of rotation of the roller body is made parallel to the axis of rotation of the capstan. When the pinch roller does not have a self alignment function or the pinch roller has a poor self alignment function, the following phenomenon occurs, degrading tape running stability. For example, tape pinching pressure may be biased, resulting in irregular stretching of the tape. The tape may possibly fall off from the pinch roller. Further, the tape may deviate upward or downward, or the speed of running of the tape may fluctuate, resulting in increased wow and flutter.

In a typical structure of a conventional pinch roller, a roller body having an elastic body such as rubber fixed on an outer peripheral surface of a cylindrical sleeve is rotatably attached on a roller shaft by means of a ball bearing. In such a structure, a very precise and small ball bearing is necessary, and hence manufacturing cost of the pinch roller is high.

In view of the foregoing, application of a plain bearing formed of resin or sintered metal which has a simple structure and is inexpensive to the pinch roller instead of the ball bearing has been proposed. FIG. 8 is an illustration showing a self alignment function of the pinch roller employing the plain bearing. When roller shaft 1 is inclined with respect to a capstan 6, roller body 3 is inclined with respect to roller shaft 1 because of a clearance provided between bearing 2 and roller shaft 1. As a result, the axis of rotation of the roller body 3 becomes parallel to the axis of the capstan 6. In the figure, reference numeral 7 represents a tape, 4 represents a metal sleeve and 5 represents a cylindrical elastic body.

However, when a large clearance is provided between bearing 2 and roller shaft 1, only the upper or lower end of the bearing 2 will be brought into contact with the roller shaft, resulting in local sliding, which causes severe friction at the upper and lower ends of the bearing 2, promoting local wear. Therefore, it becomes difficult to satisfy the requirement of durability of the pinch roller.

In a structure such as shown in FIG. 8, it is possible that the roller body 3 is largely inclined not only with respect to the direction of the capstan 6 but also to the direction of running of tape 7 orthogonal thereto. When the roller body 3 is inclined significantly in the direction of tape running by some cause such as vibration or shock at the time of mode switching, the roller body 3 and the capstan 6 will be in point contact and not in line contact. In this case, pressure does not act uniformly in the widthwise direction of the tape 7 pinched therebetween, causing irregular stretch of the tape 7. In addition, wow and flutter are increased because of snaking or upward/downward movement of the tape 7, so that it is difficult to satisfy the tape running stability.

SUMMARY OF THE INVENTION

An object of the present invention is to provide a pinch roller using a plain bearing which still effectively exhibits a self alignment function and fully satisfies the requirements of the pinch roller apparatus including durability and tape running stability, and to provide a pinch roller apparatus including such a pinch roller.

The pinch roller in accordance with the present invention includes a roller shaft, and a cylindrical roller body with a surface formed of an elastic material attached rotatably on the roller shaft by means of a plain bearing, and exhibits a self alignment function. In such a pinch roller, the feature of the present invention resides in that the plain bearing is formed of resin having a Young's modulus of 10 kgf/mm$^2$ to 1500 kgf/mm$^2$, and a self alignment function is realized by elastic deformation of the plain bearing.

The function and effect provided by the structure above will be described with reference to FIG. 7. It is possible to absorb, by elasticity of the resin forming bearing 102, the difference in paralellism between the axis of capstan 106 and pinch roller 100 which is unavoidable in design and manufacturing, and thus a self alignment function is exhibited. More specifically, by the elasticity of the resin forming bearing 102, the axis of rotation of roller body 103 becomes parallel to the axis of capstan 106, and the inner peripheral surface of bearing 102 is allowed to slide over roller shaft 101 in a state close to plane contact. Therefore, even when the self alignment function is being exhibited, roller shaft 101 and the inner peripheral surface of bearing 102 are not brought into point contact, whereby severe local wear of bearing 102 is prevented. Accordingly, durability of the pinch roller is ensured even when the bearing is formed of resin. In the figure, reference numeral 104 denotes a sleeve and 105 denotes an elastic body.

As described above, in the present invention, self alignment is realized by elasticity of the resin forming the bearing. Therefore, it is not necessary to perform self alignment utilizing the clearance between the roller shaft and the inner peripheral surface of the bearing. What is necessary is minimum clearance ensuring smooth rotation between the roller shaft and the inner peripheral surface of the bearing. Therefore, the roller body is not excessively inclined in the direction of tape running. Even if the roller body is inclined temporarily in the direction of tape running by some cause or other, the roller body can automatically restore its original state because of the restoring force provided by elasticity of the resin forming the bearing. In this manner, irregular stretch or snaking of the tape caused by inclination of the roller body to the direction of tape running, as well as wow and flutter can be suppressed, and satisfactory tape running stability is ensured.

In one embodiment, the plain bearing has a solid cylindrical shape, and the resin has a Young's modulus of 10 kgf/mm$^2$ to 200 kgf/mm$^2$. The resin is selected, for example, from the group consisting of a polyolefin, a fluoride resin and a thermoplastic elastomer. In this embodiment, the resin forming the bearing itself elastically deforms, realizing the self alignment function.

In another embodiment of the present invention, the plain bearing includes a gap, and the resin has a Young's modulus of 50 kgf/mm² to 1500 kgf/mm². In this embodiment, presence of the gap provides higher structural flexibility of the plain bearing. The self alignment function is realized by structural flexibility of the bearing, in addition to the elasticity of the resin forming the bearing. In this embodiment, since structural flexibility is utilized in addition to the elasticity of the resin, the resin applicable to the bearing may have a wider tolerable range of Young's modulus. More specifically, in the structure of a bearing without any gap, deformation of the bearing must be fulfilled only by the elasticity of the resin, and therefore, a resin having a relatively low Young's modulus must be selected. For this reason, other characteristics, for example, shape stability, must be sacrificed. Meanwhile, the provision of gaps in the bearing brings about structural flexibility of the bearing, and therefore, a resin having a high Young's modulus may be selected without sacrificing any other characteristic. Since the degree of flexibility of the bearing can be controlled by adjusting the shape or number of the gaps regardless of the characteristics of the resin, an optimal bearing can be obtained by appropriately selecting the type of the resin and structure of the bearing.

In one embodiment, the gap extends in an axial direction of the plain bearing. In this example, the plurality of gaps are formed radially around the axis of the plain bearing, for example.

In another embodiment, the gap is formed as a ring around the axis of the plain bearing. In still another embodiment, the plain bearing includes an inner shell having a central hole, a ring body formed of foamed resin having a number of gaps and surrounding the inner shell, and an outer shell surrounding the ring body.

The resin for forming the plain bearing with gaps is selected, for example, from the group consisting of polyolefin, fluoride resin, polyamide, polyoxymethylene, polyester, polyethersulfone, polyphenylenesulfide and polyetheretherketone.

The pinch roller apparatus in accordance with the present invention includes a rotationally driven capstan, an arm movable toward or away from the capstan, a roller shaft having its base end attached to the arm, and a cylindrical roller body with a surface formed of an elastic material and rotatably attached on a tip end side of the roller shaft by means of a plain bearing. The roller body is pressed against the capstan when the arm is moved toward the capstan.

In the pinch roller apparatus having the above described structure, according to one aspect of the present invention, the plain bearing is formed of resin having a Young's modulus of 10 kgf/mm² to 1500 kgf/mm². Further, contact area between the roller shaft and bearing when the roller body is pressed against the capstan is set in a range of 30 to 80% with respect to an area of projection of the inner peripheral surface of the bearing. Here, in a preferred embodiment, the roller shaft is inclined such that its tip end comes close to the capstan, and the angle of inclination ($\alpha$) of the axis of the roller shaft with respect to the axis of the capstan is within the range of $0°<\alpha\leq7°$. The plain bearing has, for example, a solid cylindrical shape, and the resin has a Young's modulus of 10 kgf/mm² to 200 kgf/mm². In one embodiment, the plain bearing includes a gap, and the resin has a Young's modulus of 50 kgf/mm² to 1500 kgf/mm².

In the pinch roller apparatus in accordance with another aspect of the present invention, the plain bearing is formed of a resin having a Young's modulus of 10 kgf/mm² to 1500 kgf/mm². The roller shaft has its tip end inclined to be closer to the capstan, angle of inclination ($\alpha$) of the axis of the roller shaft with respect to the axis of the capstan is within the range of $0°<\alpha\leq7°$. In a preferred embodiment, the plain bearing has a solid cylindrical shape, and the resin has a Young's modulus of 10 kgf/mm² to 200 kgf/mm². In another embodiment, the plain bearing includes a gap, and the resin has a Young's modulus of 50 kgf/mm² to 1500 kgf/mm².

In the pinch roller apparatus in accordance with any of these aspect, a preferable range of the angle of inclination of the axis of the roller shaft with respect to the axis of the capstan is $0°<\alpha\leq3°$.

When contact area between the roller shaft and the plain bearing is set in a range of 30 to 80% with respect to the area of projection of the inner peripheral surface of the plain bearing, smooth rotation of the roller body is ensured, while wear of the bearing is minimized. When the contact area is smaller than 30% of the area of projection, the contact is close to point contact, resulting in severe local wear of the bearing. When the contact area exceeds 80% of the area of projection, slidability in rotation of the roller body is degraded.

With the angle of inclination of the axis of the roller shaft with respect to the axis of the capstan set within the range of $0°<\alpha\leq7°$, when the roller body is pressed against the capstan, the roller shaft is pushed back by the reaction force to be parallel to the capstan. Therefore, difference in parallelism between the axis of the capstan and the roller shaft can be made smaller, and the self alignment function can fully be exhibited even by a bearing having a small degree of flexibility (deformation). This means that the roller body has a high capability of automatic recovery when it is inclined in the direction of tape running. In this manner, irregular stretch or snaking of the tape caused by inclination of the roller body to the direction of the tape running direction, as well as wow and flutter can be effectively suppressed, and hence highly satisfactory running stability of the tape is ensured.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a vertical sectional view showing another example of the plain bearing;

FIG. 5 is a vertical sectional view showing a still another example of the plain bearing;

FIG. 6 is a vertical sectional view showing a still further example of the plain bearing;

DESCRIPTION OF THE PREFERRED EMBODIMENTS

Figure 1:
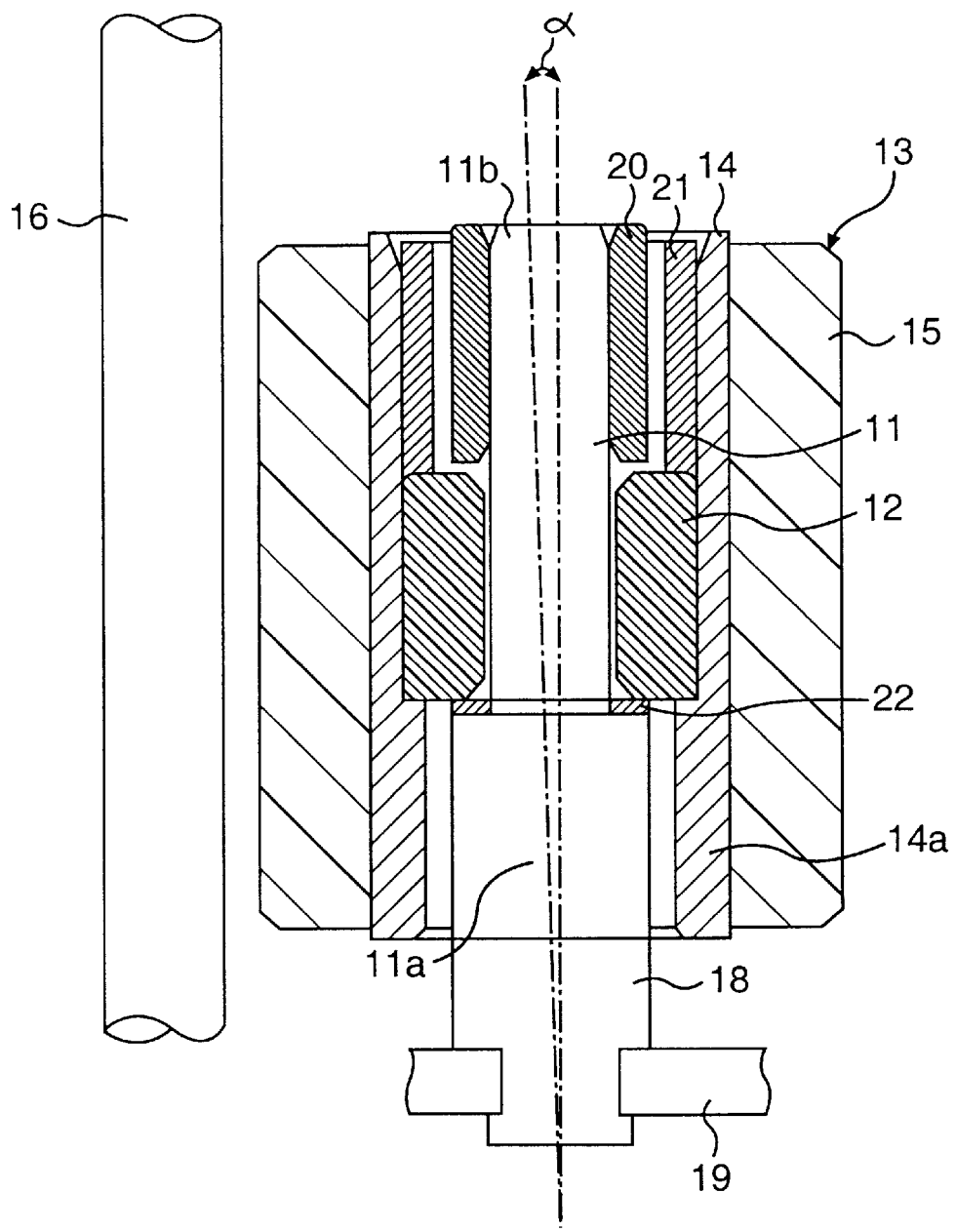
FIG. 1 is a vertical sectional view showing one embodiment of the present invention.

Referring to FIG. 1, the pinch roller includes a roller shaft 11, and a cylindrical roller body 13 rotatably attached to roller shaft 11 by means of a plain bearing 12.

Roller body 13 includes a cylindrical elastic body 15 formed of a synthetic rubber or the like fixed on an outer peripheral surface of a metal sleeve 14 formed of aluminum, brass or the like. Roller body 13 together with bearing 12 rotates around roller shaft 11. As for the method of attaching bearing 12 in roller body 13, in the embodiment of FIG. 1, an engaging portion 14a protruding inwardly is provided at one end on an inner peripheral surface of sleeve 14, and bearing 12 is supported by the upper end of the engaging portion 14a. The position of bearing 12 is fixed by a retention member 21 fit in sleeve 14. A stopper member 20 is fit in the tip end 11b of roller shaft 11. Stopper member 20 is to prevent movement of roller body 13 in the axial direction of roller shaft 11. However, the method is not limited thereto.

Roller shaft 11 is attached to arm 19 such that its tip end 11b is inclined in advance with respect to the axis of capstan 16 to be closer to capstan 16. In the figure, reference numeral 22 denotes a washer and 18 denotes a caulking member. While roller shaft 11 is arranged inclined in advance, it is pushed back by the reaction force from capstan 16 when roller body 13 is pressed against capstan 16 and, in that state, the axis of roller shaft 11 is approximately parallel to the axis of capstan 16.

In the embodiment shown in FIG. 1, inclination of roller shaft 11 is set as it is attached inclined with respect to the attachment surface of arm 19 by means of caulking member 18 and washer 22. However, the method of adjusting the inclination is not limited to that shown in the figure, and an arbitrary method may be selected. For example, arm 19 itself, on which roller shaft 11 is attached, may be inclined so that the roller shaft 11 is inclined with respect to capstan 16.

Bearing 12 is formed of a resin having a Young's modulus of 10 kgf/mm$^2$ to 1500 kgf/mm$^2$. Self alignment function of the pinch roller is realized by elastic deformation of bearing 12.

In the embodiment shown in FIG. 1, bearing 12 has a solid cylindrical shape, and the resin has a Young's modulus of 10 kgf/mm$^2$ to 200 kgf/mm$^2$. More preferably, the Young's modulus is 20 kgf/mm$^2$ to 180kgf/mm$^2$. When roller body 13 is pressed against capstan 16, the self alignment function is exhibited by elastic deformation of bearing 12.

When Young's modulus of the resin forming the bearing is higher than 200 kgf/mm$^2$, it becomes difficult to realize the self alignment function solely by the elastic deformation of bearing 12, to adjust the difference in parallelism between axes of capstan 16 and roller shaft 11. As a result, bearing 12 and roller shaft 11 slide with each other in point contact, resulting in severe local wear of bearing 12. Meanwhile, when Young's modulus is smaller than 10 kgf/mm$^2$, the strength of plain bearing 12 decreases. In addition, capability of automatic recovery is degraded. As a result, roller body 13 which has inclined in the tape running direction cannot return to its original place.

As for the resin forming bearing 12 having a solid cylindrical shape, any resin may be used provided that it has a Young's modulus within the aforementioned range. Preferable resins include polyolefin such as polyethylene, polypropylene or a copolymer mainly consisting of these, fluoride resin such as polytetrafluoroethylene, tetrafluoroethylene-perfluoroalkylvinylether copolymer, tetrafluoroethylene-hexafluoropropylene copolymer, ethylene-tetrafluoroethylene copolymer, polychlorotrifluoroethylene, polyvinylidenefluoride or the like, and a thermoplastic elastomer such as a polyester thermoplastic elastomer.

Alternatively, the resin for forming bearing 12 may contain a solid lubricant such as graphite, fluoride resin or molybdenum disulfide, or a reinforcing member such as glass fiber or carbon fiber, within the range satisfying the condition of Young's modulus mentioned above and not significantly degrading slidability of bearing 12.

As for the clearance between the central through hole provided in bearing 12 and roller shaft 11 inserted into the through hole, a minimum clearance necessary for smooth rotation of bearing 12 with respect to roller shaft 11 has to be ensured. When polyolefin is used as the material of bearing 12, the difference between the outer diameter of roller shaft 11 and the inner diameter of bearing 12 should be 1.0% to 8.0% with respect to the outer diameter of roller shaft 11. More preferably, the difference should be 1.5% to 4.0%. If the difference is smaller than 1.0%, bearing 12 may possibly catch roller shaft 11 by thermal expansion of roller shaft 11 or bearing 12, hindering rotation of bearing 12. If the difference exceeds 8.0%, the inclination of roller body 13 or the direction of tape running may possibly be too large, hindering stability in tape running.

The angle of inclination ($\alpha$) of the axis of roller shaft 11 with respect to the axis of capstan 16 is within the range of $0<\alpha\leq 7°$. When the angle ($\alpha$) of inclination is not larger than 0°, parallelism between the axes of capstan 16 and roller shaft 11 will be degraded when roller body 13 is pressed against capstan 16. Meanwhile, when the angle ($\alpha$) of inclination is larger than 7°, the axes of capstan 16 and roller shaft 11 will be largely deviated from the parallelism therebetween when roller body 13 is pressed against capstan 16. In either case, it is not possible to compensate for the deviation from the parallelism by the self alignment function realized by elastic deformation of the bearings. Therefore, the angle ($\alpha$) of inclination of roller shaft 11 must be in the range of $0°<\alpha\leq 7°$. More preferable range is $0°<\alpha 3°$. The angle ($\alpha$) of inclination refers to an angle between the axis of roller shaft 11 and the axis of capstan 16 in a state immediately before roller body 13 is pressed against capstan 16.

With roller body 13 pressed against capstan 16, the contact area between roller shaft 11 and the inner 3peripheral surface of bearing 12 is set to be 30% to 80% of the area of projection of the inner peripheral surface of bearing 12. Here, the area of projection of the inner peripheral surface of bearing 12 is calculated as a product of the length of bearing 12 multiplied by the inner diameter of bearing 12. When the contact area is smaller than 30% of the area of projection, the contact is close to point contact, possibly resulting in severe local wear of bearing 12. When the contact area exceeds 80% of the area of projection, slidability in rotation of roller body 13 is degraded.

In the embodiment shown in FIG. 1, bearing 12 has a solid cylindrical shape, and the self alignment function is realized by elastic deformation derived from its material. As another embodiment, the plain bearing may have a plurality of gaps. In that case, the resin forming the plain bearing has a Young's modulus of 50 kgf/mm$^2$ to 1500 kgf/mm$^2$.

Figure 2:
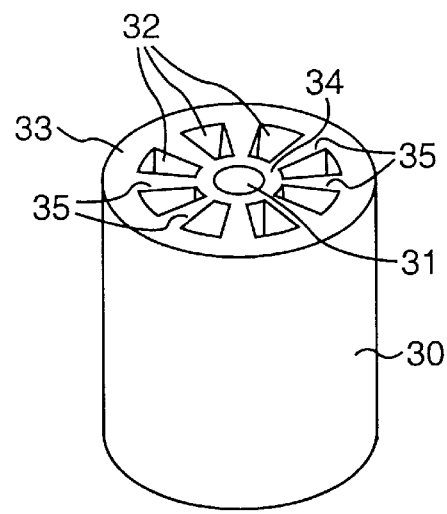
FIG. 2 is a perspective view showing an example of the plain bearing.
Figure 3:
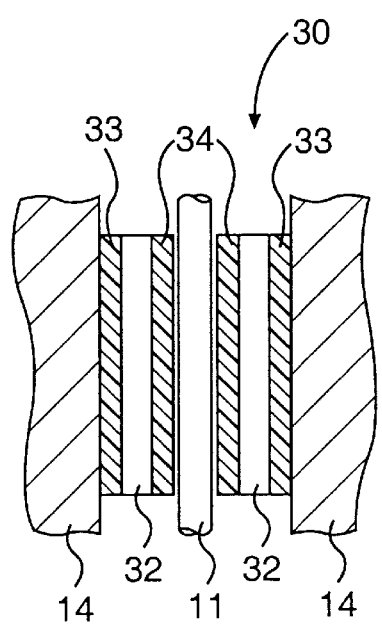
FIG. 3 is a vertical sectional view of the plain bearing shown in FIG. 2.

Plain bearing 30 shown in FIGS. 2 and 3 has a plurality of gaps 32 formed radially around a central hole 31. Gap 32 extends through bearing 30 in the axial direction. Thus, bearing 30 is shaped to include an outer shell 33, an inner shell 34 and ribs 35 coupling the shells.

A plain bearing 40 shown in FIG. 4 includes two ring shaped gaps 43 formed as rings around its axis. Thus, bearing 40 has a shape including an inner shell 41, an outer shell 42 and a connecting portion 44 connecting the shells.

A plain bearing 50 shown in FIG. 5 includes a cylindrical portion 51 having a central hole, and a flange portion 52 provided on an outer periphery of cylindrical portion 51. Ring shaped gaps 53 are formed above and below flange portion 52. A plain bearing 60 shown in FIG. 6 includes an inner shell 61 having a central hole, a ring body 62 formed of foamed resin having a number of gaps 64 and surrounding inner shell 61, and an outer shell 63 surrounding ring body 62.

Plain bearings shown in FIGS. 2 to 6 each have a plurality of gaps. By the provision of gaps, the degree of flexibility (deformation) of the plain bearing can be adjusted by varying the structure thereof, in addition to the elasticity which is the property of the resin per se. Therefore, as compared with a bearing without any gap, the plain bearing having gaps may be formed using resin having a higher Young's modulus. More specifically, the resin applicable to the bearing with gaps has a Young's modulus of 50 kgf/mm$^2$ to 1500kgf/mm$^2$, and preferably 100 kgf/mm$^2$ to 1000 kgf/mm$^2$. As for the resin forming the plain bearing with gaps, any resin may be used provided that it has a Young's modulus within the aforementioned range. For example, such resins include, in addition to polyolefin and fluoride resin, polyamide such as nylon 6 and nylon 66, polyoxymethylene such as acetal copolymer or acetal homopolymer, polyester such as polybutyleneterephthalate, polyethersulfone, polyphenylenesulfide and polyetheretherketone. Alternatively, the resin for forming the bearing may contain a solid lubricant such as graphite, fluoride resin or molybdenum disulfide, or a reinforcing member such as glass fiber or carbon fiber, in the range satisfying the condition of Young's modulus mentioned above and not significantly degrading slidability of the bearing.

Figure 7:
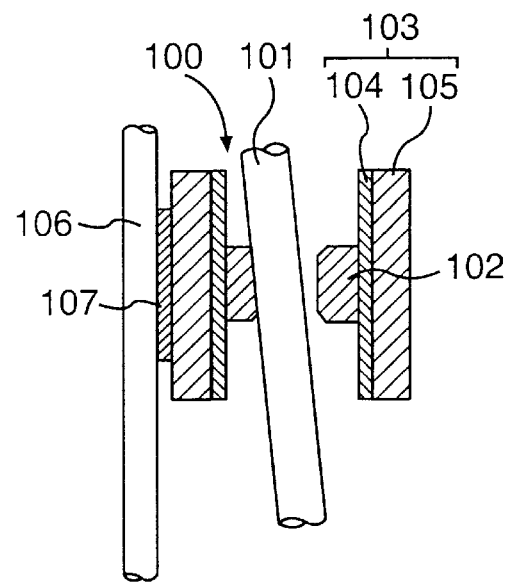
FIG. 7 is a vertical sectional view schematically showing relation between the roller shaft and the bearing.
Figure 8:
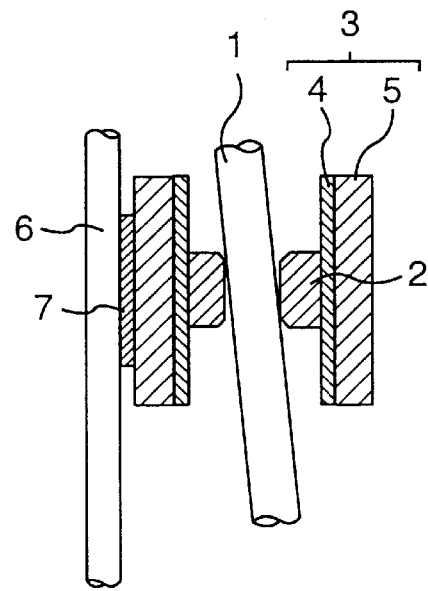
FIG. 8 is a vertical sectional view showing a conventional pinch roller apparatus.

In any of the embodiments above, the self alignment function of the pinch roller is realized by elastic deformation of the plain bearing. This will be described with reference to FIG. 7.

Assume that roller shaft 101 is inclined by a prescribed angle ($\alpha$) with respect to capstan 106. In this state, roller body 103 is pressed against capstan 106 with tape 107 pinched therebetween. Roller body 103 includes a metal sleeve 104 and an elastic body 105 surrounding the sleeve. Roller shaft 101 is, when roller body 103 is pressed against capstan 106, pushed back to be parallel to capstan 106 by its reaction force. However, since capstan 106 and roller shaft 101 are not perfectly parallel to each other, that side of the inner peripheral surface of bearing 102 which is in contact with roller shaft 101 deforms, shrinking from a lower to an upper end, exhibiting the self alignment function to correct the difference in parallelism. Accordingly, the axis of rotation of roller body 103 becomes parallel to the axis of capstan 106, ensuring satisfactory running of tape 107. Meanwhile, since the inner peripheral portion of bearing 102 and roller shaft 101 slide in plane contact, high durability of bearing 102 is ensured.

(EXAMPLE 1)

A bearing having an outer diameter of 7 mm, inner diameter of 3.045 mm, length of 3 mm without any gap was fabricated, using polyethylene having a Young's modulus of 150 kgf/mm$^2$ as the resin forming the bearing. A pinch roller apparatus such as shown in FIG. 1 was fabricated using the bearing. In this example, the roller body was prepared by fixedly adhering a cylindrical elastic body formed of synthetic rubber on an outer peripheral surface of an aluminum sleeve, which body had an outer diameter of 10 mm and a length of 14 mm. The roller shaft had an outer diameter of 2.985 mm. In other words, the difference (0.060 mm) between the outer diameter of the roller shaft and the inner diameter of the bearing was 2.0% with respect to the outer diameter of the roller shaft. In a state immediately before the roller body was pressed against the capstan, the roller shaft was inclined in advance in the direction of the capstan such that the angle of inclination $\alpha$ of the axis of the roller shaft with respect to the axis of the capstan was 0.5°. In the pinch roller apparatus, pressure forcing the roller body to the capstan was set to 800 gf, and the axis of the roller shaft and the capstan were made approximately parallel to each other when the roller body was pressed against the capstan. In this state, the contact area between the roller shaft and the bearing was 40% with respect to the area of projection of the inner peripheral surface of the bearing.

(EXAMPLE 2)

A plain bearing having the shape shown in FIG. 2 in which an outer shell and an inner shell were coupled by eight ribs extending radially, was fabricated by using polyethylene having a Young's modulus of 150 kgf/mm$^2$ as the resin for forming the bearing. The plain bearing had an outer diameter of 7 mm, an inner diameter of the inner shell of 2.545 mm and a length of 4.5 mm. A pinch roller apparatus such as shown in FIG. 1 was fabricated using the bearing. In this example, the roller body was prepared by fixedly adhering a cylindrical elastic body formed of synthetic rubber on the outer peripheral surface of an aluminum sleeve, and the body had an outer diameter of 14 mm and a length of 18 mm. The outer diameter of the roller shaft was 2.485 mm. More specifically, the difference (0.060 mm) between the outer diameter of the roller shaft and the inner diameter of the bearing was set to be 2.4% with respect to the outer diameter of the roller shaft. In a state immediately before the roller body was pressed against the capstan, the roller shaft was inclined in advance to the direction of the capstan such that the angle of inclination $\alpha$ of the axis of the roller shaft with respect to the axis of the capstan was 0.25°. In the pinch roller apparatus, pressure for forcing the roller body to the capstan was set to 1300 gf, and the roller shaft and the capstan were made approximately parallel to each other with the roller body pressed against the capstan. In this state, the contact area between the roller shaft and the bearing was 60% with respect to the area of projection of the inner peripheral surface of the bearing.

(COMPARATIVE EXAMPLE)

A bearing having an outer diameter of 7mm, an inner diameter of 3.19 mm, a length of 3 mm without any gap was fabricated using polyoxymethylene having a Young's modulus of 290 kgf/mm$^2$ as the resin for forming the bearing. In this comparative example, the roller body was prepared by fixedly adhering a cylindrical elastic body formed of synthetic resin on the outer peripheral surface of an aluminum sleeve, which body had an outer diameter of 10 mm and a length of 14 mm. The outer diameter of the roller shaft was 2.94 mm. More specifically, the difference (0.25 mm) between the outer diameter of the roller shaft and the inner diameter of the bearing was set to be 8.5% with respect to the outer diameter of the roller shaft. The roller shaft was not inclined in advance with respect to the capstan. In the pinch roller apparatus, the pressure for forcing the roller body to the capstan was set to 800 gf, and the clearance between the bearing and the roller shaft exhibited a self alignment function with the roller body pressed against the capstan, so that the roller body and the capstan wire made parallel to each other. In this state, the contact area between the roller shaft and the bearing was 20% with respect to the area of projection of the inner peripheral surface of the bearing.

(EVALUATION TEST)

A running test in which replay, fast forward and rewind operations of a video tape were repeated at random as in a practically used video cassette, was performed at room temperature, 0° C. and 50° C., for the pinch roller apparatuses of Examples 1 and 2. In both of the pinch roller apparatuses, the tape running was stable even when the running time exceeded 5000 hours, and it could be confirmed that the self alignment function was fully exhibited and that the bearing had sufficient durability.

A similar running test was performed on the pinch roller apparatus of the comparative example. In the apparatus, the vertical motion of tape running was observed. The tape running was not stable at any temperature condition. After running of about 200 hours, the tape was wrinkled, and damaged because of stretching and folding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pinch roller apparatus, comprising:
   a roller shaft;
   a cylindrical roller body having a surface formed of an elastic material; and
   a plain bearing for rotatably mounting said cylindrical roller body to said roller shaft, said plain bearing having an inner surface adjacent said roller shaft and an outer surface contacting said roller body, said plain bearing further including means for self-aligning the roller body with a capstan of a pinch roller apparatus, said means for self-aligning including:
      said plain bearing being formed of a resin having a Young's modulus of 10 kgf/mm$^2$ to 1500 kgf/mm$^2$; and
      when said cylindrical roller body contacts the capstan, elastic deformation of said plain bearing causes self-alignment of the roller body.

2. The pinch roller apparatus according to claim 1, wherein
   said plain bearing has a solid cylindrical shape, and
   the Young's modulus of said resin is 10 kgf/mm$^2$ to 200 kgf/mm$^2$.

3. The pinch roller apparatus according to claim 2, wherein the resin forming said plain bearing is selected from the group consisting of polyolefin, fluoride resin and thermoplastic elastomer.

4. The pinch roller apparatus according to claim 1, wherein
   said plain bearing includes a gap, and
   the Young's modulus of said resin is 10 kgf/mm$^2$ to 1500 kgf/mm$^2$.

5. The pinch roller apparatus according to claim 4, wherein
   said gap extends in an axial direction of said bearing, said gap is located between said inner and said outer surfaces of said bearing.

6. The pinch roller apparatus according to claim 5, wherein
   said plain bearing includes a plurality of gaps, and
   said plurality of gaps are formed radially around the axis of said plain bearing.

7. The pinch roller apparatus according to claim 4, wherein
   said gap is formed to have a ring shape around the axis of said plain bearing.

8. The pinch roller apparatus according to claim 4, wherein
   said plain bearing includes an inner shell having a central hole, a ring body formed of foamed resin having a number of gaps and surrounding said inner shell, and an outer shell surrounding said ring body.

9. The pinch roller apparatus according to claim 4, wherein
   the resin forming said plain bearing is selected from the group consisting of polyolefin, fluoride resin, polyamide, polyoxymethylene, polyester, polyethersulfone, polyphenylenesulfide and polyetheretherketone.

10. The pinch roller apparatus according to claim 1, the apparatus, comprising:
    a rotary driven capstan;
    an arm movable in a direction toward and away from said capstan; and
    said roller shaft having a base end attached to said arm; wherein
       said cylindrical roller body is rotatably attached to a tip end of said roller shaft with said plain bearing posed therebetween;
       said roller body is pressed against said capstan when said arm is moved toward said capstan; and
       a contact area between the roller shaft and the plain bearing when said roller body is pressed against said capstan is set to be within a range of 30 to 80% with respect to an area of projection of an inner peripheral surface to the plain bearing.

11. The pinch roller apparatus according to claim 10, wherein
    said roller shaft is inclined such that the tip end is closer to said capstan, an angle of inclination ($\alpha$) of an axis of said roller shaft with respect to an axis of said capstan is within a range of $0° < \alpha \leq 7°$.

12. The pinch roller apparatus according to claim 10, wherein
    said plain bearing has a solid cylindrical shape, and
    said resin has a Young's modulus of 10 kgf/mm$^2$ to 200kgf/mm$^2$.

13. The pinch roller apparatus according to claim 10, wherein
    said plain bearing includes a gap, and
    said resin has a Young's modulus of 50 kgf/mm$^2$ to 1500 kgf/mm$^2$.

14. The pinch roller apparatus according to claim 1, the apparatus comprising:
    a rotary driven capstan;
    an arm movable in a direction toward and away from said capstan;

said roller shaft having a base end attached to said arm; and said cylindrical roller body rotatably attached to a tip end of said roller shaft with said plain bearing posed therebetween; wherein said roller body is pressed against said capstan when said arm is moved toward said capstan; and said roller shaft is inclined such that the tip end is closer to said capstan, an angle of inclination ($\alpha$) of an axis of said roller shaft with respect to an axis of said capstan is within a range of $0°<\alpha\leq7°$.

15. The pinch roller apparatus according to claim 14, wherein said plain bearing has a solid cylindrical shape, and said resin has a Young's 's modulus of 10 kgf/mm$^2$ to 200 kgf/mm$^2$.

16. The pinch roller apparatus according to claim 14, wherein said plain bearing includes a gap and said resin has a Young's modulus of 50 kgf/mm$^2$ to 500 kgf/mm$^2$.

17. The pinch roller apparatus according to claim 1, wherein said cylindrical roller body includes said surface formed of an elastic material and an inner metal sleeve.

18. The pinch roller apparatus according to claim 17, wherein said inner metal sleeve includes an engaging portion for receiving an end surface of said plain bearing.

* * * * *

UNITED STATES PATENT AND TRADEMARK OFFICE
CERTIFICATE OF CORRECTION

PATENT NO. : 5,934,538
DATED : August 10, 1999
INVENTOR(S) : Mitsuaki Hirose et al.

It is certified that error appears in the above-identified patent and that said Letters Patent is hereby corrected as shown below:

Column 12,
Line 6, please change "500" to -- 1500 --.

Signed and Sealed this

Fifth Day of February, 2002

Attest:

JAMES E. ROGAN
*Attesting Officer*     *Director of the United States Patent and Trademark Office*